(12) United States Patent
Tadakamalla (10) Patent No.: US 7,216,917 B2
(45) Date of Patent: May 15, 2007

(54) RETRACTABLE SUN VISOR AND FULL WINDSHIELD COVER

(76) Inventor: Anand Tadakamalla, 1057 Reed Ter., Apt. #1, Sunnyvale, CA (US) 94086

( * ) Notice: Subject to any disclaimer, the term of this patent is extended or adjusted under 35 U.S.C. 154(b) by 0 days.

(21) Appl. No.: 11/373,644

(22) Filed: Mar. 10, 2006

(65) Prior Publication Data

US 2006/0202501 A1 Sep. 14, 2006

Related U.S. Application Data

(60) Provisional application No. 60/661,266, filed on Mar. 11, 2005.

(51) Int. Cl.
*B60J 3/00* (2006.01)

(52) U.S. Cl. .................. 296/97.4; 296/97.9; 296/97.8; 296/97.11

(58) Field of Classification Search ............... 296/97.4, 296/97.9, 97.8, 97.11, 97.12, 97.13, 9.12; 160/238, 242, 243, 265, 266, 275, 267.1, 160/293.1

See application file for complete search history.

(56) References Cited

U.S. PATENT DOCUMENTS

| | | | |
|---|---|---|---|
| 2,289,644 A | 7/1942 | Gano | |
| 2,549,395 A | 4/1951 | Short, Sr. | |
| 4,671,558 A | 6/1987 | Cline | |
| 4,810,023 A | 3/1989 | Kawada | |
| 4,836,599 A | 6/1989 | Svensson | |
| 4,921,299 A * | 5/1990 | Herrick ...................... 296/97.8 | |
| 4,958,879 A | 9/1990 | Gillum | |
| 4,988,139 A | 1/1991 | Yamada | |
| 4,989,910 A | 2/1991 | Mersman | |
| 5,040,839 A | 8/1991 | Moore | |
| 5,064,238 A | 11/1991 | Mohtasham | |
| 5,076,633 A * | 12/1991 | Hsu et al. .................. 296/97.4 |
| 5,085,473 A * | 2/1992 | Yang .......................... 296/97.8 |
| 5,098,149 A | 3/1992 | Lee | |
| 5,133,585 A * | 7/1992 | Hassan ....................... 296/97.8 |
| 5,135,279 A * | 8/1992 | Beatty ........................ 296/97.1 |
| 5,192,110 A | 3/1993 | Mykytiuk | |
| 5,201,563 A * | 4/1993 | Liao ............................ 296/97.8 |
| 5,232,244 A * | 8/1993 | Itoh ............................ 296/97.8 |
| 5,267,768 A * | 12/1993 | Tsai ............................ 296/97.8 |
| 5,328,227 A | 7/1994 | Pax, Jr. | |

(Continued)

FOREIGN PATENT DOCUMENTS

| | | |
|---|---|---|
| WO | WO/01/34418 | 5/2001 |
| WO | WO/03/010020 | 2/2003 |
| WO | WO/03/104003 | 12/2003 |
| WO | WO/2004/039616 | 5/2004 |
| WO | WO/2004/060704 | 7/2004 |
| WO | WO/2005/030512 | 4/2005 |
| WO | WO/2005/090107 | 9/2005 |

*Primary Examiner*—Lori L. Lyjak
(74) *Attorney, Agent, or Firm*—Law Office of Alan W. Cannon (57) ABSTRACT

A multifunction, retractable sun shielding apparatus. A retractable screen, a housing configured to receive and contain the retractable screen upon retracting the screen, and a drive mechanism attached to longitudinal edges of the screen, and configured to drive the screen in directions of retraction and deployment. A power switch may be provided that is actuatable by an operator to drive the drive mechanism to deploy or retract the retractable screen. An interlock automatically stops deployment of the retractable screen at a first predefined position where the screen functions as a visor with regard to an adjacent windshield, and a second predefined position where the screen fully covers the adjacent windshield.

27 Claims, 6 Drawing Sheets

U.S. PATENT DOCUMENTS

| | | | |
|---|---|---|---|
| 5,409,284 A | 4/1995 | Mahler | |
| 5,443,300 A | 8/1995 | Mohammed | |
| 5,445,427 A | 8/1995 | Vandagriff | |
| 5,560,668 A * | 10/1996 | Li | 296/97.8 |
| 5,720,508 A | 2/1998 | Mohammed | |
| 5,782,284 A | 7/1998 | Leatherman | |
| 5,791,721 A * | 8/1998 | Lin | 296/97.8 |
| 5,947,544 A | 9/1999 | Hubeshi | |
| 6,047,762 A | 4/2000 | Anderson | |
| 6,131,987 A | 10/2000 | Rossiter | |
| 6,227,601 B1 * | 5/2001 | LaFrance | 296/97.4 |
| 6,279,984 B1 | 8/2001 | Reina, Jr. | |
| 6,309,076 B1 | 10/2001 | McVicker | |
| 6,406,086 B2 | 6/2002 | Bauer | |
| 6,407,365 B1 * | 6/2002 | De Prete, III | 296/97.4 |
| 6,488,328 B2 | 12/2002 | Quapil | |
| 6,536,829 B2 * | 3/2003 | Schlecht et al. | 296/97.8 |
| 6,546,990 B2 * | 4/2003 | Peeters | 296/97.8 |
| 6,682,121 B1 | 1/2004 | Conforti | |
| 6,776,211 B2 | 8/2004 | Schlecht et al. | |
| 6,848,493 B1 * | 2/2005 | Hansen et al. | 296/97.8 |
| 6,892,786 B2 | 5/2005 | Messerschmidt | |
| 6,979,042 B2 * | 12/2005 | Kawasaki | 296/97.8 |
| 6,997,501 B2 | 2/2006 | Conforti | |
| 2002/0059986 A1 * | 5/2002 | Schlecht et al. | 296/97.8 |
| 2004/0056504 A1 * | 3/2004 | Hattass et al. | 296/97.8 |
| 2004/0119313 A1 | 6/2004 | Naik | |

* cited by examiner

RETRACTABLE SUN VISOR AND FULL WINDSHIELD COVER

CROSS-REFERENCE

This application claims the benefit of U.S. Provisional Application No. 60/661,266, filed Mar. 11, 2005, which application is incorporated herein, in its entirety, by reference thereto.

FIELD OF THE INVENTION

This invention relates to sun visors and sun shades in automobiles, specifically to such visors which are used to block sun light/sun rays from directly hitting drivers' eyes, and also to use for full coverage of windshields to prevent sun damage to the interior of an automobile and/or to provide security.

BACKGROUND OF THE INVENTION

Automobiles are commonly equipped with fold-up or fold-back sun visors that block sun light or sun rays from the a top portion of the front windshield to enable drivers and front passengers to reduce glare to provide a clearer view of the road ahead. Such visors also typically pivot and can be moved to the driver side or passenger side windows to partially block the sun.

These visors were primarily designed to block the sun rays that could cause problems for drivers to see the road ahead and they perform that function adequately. The pair of sun visors (driver's side and passenger's side) does not cover the entire width of the windshield. Secondly, there is no solution from auto makers to prevent damage to the auto interior caused during the day when automobiles are parked on streets or in uncovered parking areas from exposure to sun.

Sun visors have seen some minor improvements since their original invention and design, such as including a vanity mirror and light, visor extendable to the center to cover the gap between the two visors (available only in luxury segment of automobiles) and holders of cloth or vinyl CD storage, commonly called automobile Visor CD holders.

Further, the two sun visors that are typically provided by the manufacturer of an automobile are not aesthetic items, in that they break the smooth form of the roof liner and the interior. They are perhaps the most antiquated products in the modem automobiles which have power seats and windows, and many more advancements automobiles are witnessing now.

Also, visors currently in the market are not designed to protect the interior of their automobiles from the heat and glare from sun when they are parked most of the day in uncovered parking lots or on streets in residential areas. The heat and direct sunlight damage the interior of the car and also affect the performance of the air conditioning. Additionally, current sun visors do not restrict a direct view of the interior which may contain shopping or other valuable items that may attract burglars.

Consumers are left with no other choice but to pay extra money and buy after-market products that cover the entire windshield and prevent damage to their car interior and also reduce the interior heating of the seats, air and steering column, especially in summer and in cities that are prone to high temperatures. These after-market products are quite clumsy, and require a discipline of the car operator to faithfully install the apparatus after each driving session, and remove the same prior to again driving. Each of these tasks is manual. Further, such a device must typically be folded up or rolled up upon removing it, and a storage location must be provided for the device when not in use. These requirements are often too onerous for the typical driver, and the device ends up not being used after a short period of time, or only used sporadically.

In summary, existing pair of visors have several disadvantages: they do not cover the entire width of the windshield; they are not designed to and do not protect the interior of the car from sun damage and heat, and thus consumers have to pay extra to protect the interior of their automobiles; they are not aesthetically pleasing; and they haven't seen any substantial technological improvement since their invention, unlike many other features of the automobile.

U.S. Pat. No. 6,279,984 B1 to Reina Jr. discloses a retractable windshield made of plastic or glass that slides down on the driver's side. Passenger side functioning is optional and independently operable. The device of Reina Jr. cannot be deployed as a visor when an automobile is in drive mode. Further, it may not be deployable in an automobile that has a sun/moon roof as there would not be sufficient room for the retractable panel. U.S. Pat. No. 5,947,544 to Hubeshi describes a "window only" sun visor and doesn't offer the dual benefits of a full cover device that also functions as a visor. U.S. Pat. No. 5,409,284 to Mahler discloses an extendable sun visor that covers the windshield all the way down but leaves a gap in between the two visors and doesn't effectively cover the entire windshield nor provide the full benefits like cutting off the heat and glare that damage an automobile interior. Further, it is not feasible to deploy Mahler's device on the rear windshield. Still further, none of the aforementioned patents disclose full coverage of windshields for protecting the interior of the automobile from sun damage and/or providing security to articles contained within the automobile.

Several patents for sun shield or windshield covers include U.S. Pat. No. 5,040,839 to Moore which provides retractable screens to cover all the areas where glass is used. Moore's covers are restricted in the sense that only one objective is achieved, that is to cut off the heat and glare when an automobile is parked. Moore's device does not provide the ability to function as a visor while an automobile is in drive mode and doesn't account for the sun roof which is almost a standard feature in most luxury cars that would obstruct the installation of the storage recesses. Additionally, the screens disclosed are provided in addition to the automobile visors and are not a replacement thereof, and hence require an additional cost to an auto manufacturer. This is a strong disincentive for automakers. U.S. Pat. No. 5,782,284 to Leatherman discloses a pair of sun shade assemblies for the windshield that are deployed from side to side, that is from "A" pillar to "A" pillar. The assembly is deployed only when the vehicle is parked and can't offer visor position while an automobile is in drive mode. Additionally, the existing visors of the automobile are required for the visor function, and hence an added cost to automakers is presented, which is a disincentive. U.S. Pat. No. 4,671,558 to Cline describes a corrugated fiber board material that attaches to the existing pair of visor shades for a full cover roll-able windshield cover. This device is usable only in parked vehicles and provides a potential replacement for other after market windshield covers. U.S. Pat. No. 6,776, 211 to Schlecht et al describes a retractable windshield cover with stretchable/expandable material but doesn't offer the-visor function for automobiles in drive mode nor interlocks.

U.S. Pat. No. 5,064,238 to Mohtasham describes a windshield cover, in addition to the existing automobile visors, to prevent sun damage to the interior and is deployable only in a parked automobile. U.S. Pat. No. 6,536,829 to Schlecht et al. does not appear to address usability with a vehicle that has a sun/moon roof, nor does it address safety requirements for the safe operation of automatic shade devices in a vehicle, and therefore does not provide any safety interlock, nor does it provide any interlock whatsoever, such as one that acts as theft deterrent. U.S. Pat. No. 5,098,149 to Lee describes a device for the purpose of shielding the interior of a parked vehicle from sunlight, which includes a retractable windshield shade assembly mounted at the front edge of an existing sun visor. A reflective coating on the exterior surface of said shade reflects part of the radiant energy. It may be swung to the side to serve as a front side window shade. In that position, it cannot function as a visor while an automobile is in drive mode. U.S. Pat. Nos. 6,997,501 and 6,682,121 to Conforti, describe sun shades for use with and mounting to a side or rear automobile window. They do not address any of the functionality of providing a dual function sun screen for a front windshield of an automobile. U.S. Pat. No. 6,309,076 to McVicker describes a bottom up sun barrier and does not work as a visor for automobiles in drive mode.

U.S. Pat. Nos. 2,289,644 and 2,549,395 describe sun visors. U.S. Pat. No. 4,810,023 to Kawada describes an extendable visor that can be extended vertically and laterally to cover a gap between the visors. U.S. Pat. No. 4,836,599 to Svensson is a two part (pair of visors) device with increased cover of the top portion of the windshield, but doesn't offer the full windshield cover functionality nor is it a powered solution. U.S. Pat. No. 4,958,879 to Gillum discloses a portable compact sun visor that could be placed over the rear view mirror post to cover the gap between the existing pair of visors to block off the sun entering from around the mirror, but lacks a full windshield coverage capability. U.S. Pat. No. 4,988,139 to Yamada describes a variable shading plastic that is housed under the roof liner in addition to the existing visors, to be deployed to reduce glare. It does not replace the existing visors, nor does it provide full windshield cover. U.S. Pat. No. 4,989,910 to Mersman, et al. provides a "two visors" concept as it currently exists but with the added benefit of stowability in the headliner and a smaller pivoting extension to cover the gap between the pair of visors. This doe not provide full windshield cover, not is it power driven. U.S. Pat. No. 5,192,110 to Mykytiuk describes a stowable visor with vanity mirror and doesn't provide the full windshield cover, nor is it power driven. U.S. Pat. No. 5,328,227 to Pax Jr. et al, describes a visor only solution which is pivotable and extendable but does not provide full windshield cover.

U.S. Pat. Nos. 5,443,300 and 5,720,508 to Mohammed describe a power glare screen that provides windshield cover. It is a power tinted two plastic screen solution that leaves a gap in the middle and doesn't provide security or obstruct interior view. U.S. Pat. No. 5,445,427 to Vandagriff discloses a sun visor attachment adapted to be secured to a preexisting sun visor, but does not offer a windshield cover solution nor a power deployment feature.

U.S. Pat. No. 6,406,086 to Bauer et al. describes a sun visor only and does not offer the full windshield cover. U.S. Pat. No. 6,488,328 to Quapil discloses a sun visor only solution that is manually adjustable for optimal shading against the sun. It is not a windshield cover solution nor is it power deployable. U.S. Pat. No. 6,131,987 to Rossiter discloses a glare reducing tinted plastic/glass visor for safe driving during day and night. This does not offer a windshield cover solution nor heat obstruction or privacy barrier when an automobile is parked in uncovered parking areas.

U.S. Pat. No. 6,047,762 to Anderson is a shade control for a vehicle window only and U.S. Pat. No. 6,892,786 to Messerschmidt et al is an assembly for a roll-up sun screen in a motor vehicle. These and the above patents solve one or the other problem—either a visor or a windshield cover that provides security in parked vehicles. They do not offer the dual benefit of functioning integrally as both sun visors and sun barrier apparatus.

WO/2005/090107 to Yamada describes a sun visor solution only and doesn't provide the windshield cover option. WO/2005/030512 to Araga and Kosokawa is a pair concept improvising over the current pair of visors concept, and does not provide a power option nor a windshield cover option.

WO/2004/060704 and U.S. Patent Application Publication No. 2004/0119313 to Naik, Sanjeev includes electrochromatic material in the visors that pivot to be deployed on the windows as well and are extendable or mechanically rollable to cover the windshield or the windows. The electrochromatic shades provide variable shading. The solution is expensive because of the requirements for components such as digital cameras, electro-chrome material, microcontrollers, etc., for the driver- and passenger-side visors. Further, when an automobile is parked and engine is shut down, the visor material, the digital cameras and the microcontrollers would all be shut down, thereby disabling the windshield shading function of this device, and therefore not providing security to the interior components of the car. WO/2004/039616 to Silvini describes a visor only solution. WO/2003/010020 to Davey, et al. is provided in addition to the existing visors of an automobile and allows for the visors to be extended to cover the gap between the pair of visors. WO/2001/034418 to Truitt also describes a visor extension built on the current visor apparatus, and does not provide full windshield cover.

It would be desirable to have a product that would function integrally as both a sun visor and also as a full sun barrier, and which could be integrated into an automobile by its manufacturer, to provide both an aesthetically pleasing, form fit product, as well as one that could function efficiently for both purposes. It would further be desirable to provide such a product with safety features, such as the ability to provide security to the interior components of the automobile when it is parked and the ability to prevent deployment of full sun shades when the vehicle is moving. It would further be desirable to provide such a product with a theft deterrent capability.

SUMMARY OF THE INVENTION

A multifunction, retractable sun shielding apparatus is provided to include a retractable screen and a housing configured to receive and contain the retractable screen upon retracting the retractable screen. The retractable screen has two longitudinal edges extending generally in a direction of retraction and two transverse edges extending transversely to the longitudinal edges. One of the transverse edges is a leading edge during deployment of the retractable screen. A drive mechanism is attached to the longitudinal edges of the screen, and configured to drive the screen in directions of retraction and deployment. A power switch is actuatable by an operator to drive the drive mechanism to deploy or retract the retractable screen. An interlock automatically stops deployment of the retractable screen at a first predefined position where the screen functions as a visor with regard to an adjacent windshield, and a second predefined position where the screen substantially fully covers the adjacent windshield.

A method of partially or fully covering a windshield of an automotive vehicle is provided, including driving a retractable screen to a first predefined position where the screen functions as a visor; and driving the retractable screen to a second predefined position where the screen substantially completely covers the windshield.

A multifunction, retractable sun shielding apparatus built into the interior of an automotive vehicle is provided, including a retractable screen dimensioned to cover a windshield of the automobile and a housing configured to receive and contain the retractable screen upon retracting the retractable screen. The screen has two longitudinal edges extending generally in a direction of retraction and two transverse edges extending transversely to the longitudinal edges, where one of the transverse edges is a leading edge during deployment of the retractable screen. The housing may be mounted adjacent to an upper edge of the windshield. A drive mechanism is biased to fully retract the screen when the screen is not restrained. At least a pair of engagement features are provided to restrain the screen at a predefined position to cover a top portion of the windshield where the screen functions as a visor. A full deployment engagement feature is provided to restrain the screen at a second predefined position to cover substantially all of the windshield with the screen.

These and other advantages and features of the invention will become apparent to those persons skilled in the art upon reading the details of the apparatus and methods as more fully described below.

DETAILED DESCRIPTION OF THE INVENTION

Before the present apparatus and methods are described, it is to be understood that this invention is not limited to particular mechanisms, materials or methods described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "a pillar" includes a plurality of such pillars and reference to "the motor" includes reference to one or more motors and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

The present invention includes apparatus that function both as a retractable full cover sun visor and full windshield cover, as well as a sun visor, so that there is no need for the sun visors that are currently provided by the manufacturer of an automobile. The present apparatus may be designed and manufactured as original equipment of a motor vehicle, so the consumer is not faced with an additional expenditure to provide protection of the interior of the vehicle from the sun, or to provide security for articles left within the vehicle when it is not being operated. The present apparatus may also be provided for the rear windshield as well.

The present invention can provide a barrier against the effects of the sun by completely covering the windshield or rear windshield to prevent or reduce ultraviolet (UV) from entering and degrading interior components made of fabric, leather or polymers. Further, the present invention may restrict generation of heat in the interior of a vehicle, thereby reducing the ambient temperature for efficient functioning of air conditioning, cooler seats and steering wheel etc. and reduce the "oven" effect in summer and hot weather conditions.

To prevent theft or burglary of the car, an apparatus covering the windshield of the vehicle may be arranged to prevent itself from retracting if the vehicle is not properly started, such as with the key, or by entering a required code of some form. The present invention may also provide a privacy barrier to prevent external viewing of the contents in the vehicle interior, as noted above. The present apparatus may be automatically driven, but may alternatively be manually operated. Additionally, automatic versions may have the option of being manually operated.

Further, the apparatus may include a logo, advertisement, written message, or other markings on one or both sides thereof.

Figure 2:
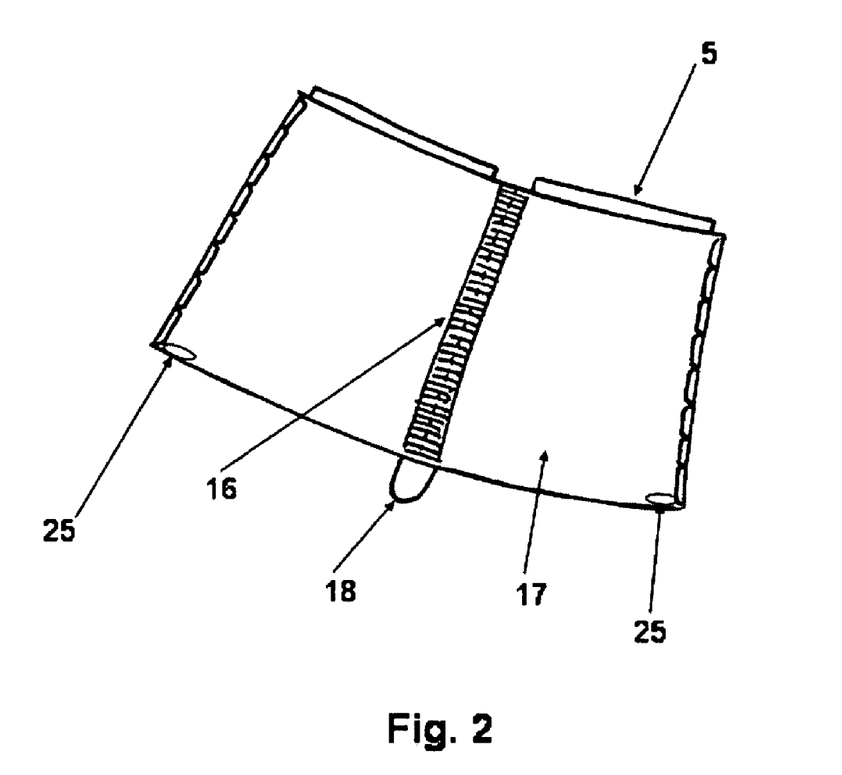
FIG. 2 shows a brush/bristle-edge in the middle of a screen of the apparatus with a "U" shaped leading edge that holds shades together, anchor points of the screen and a spring loaded roller.
Figure 4:
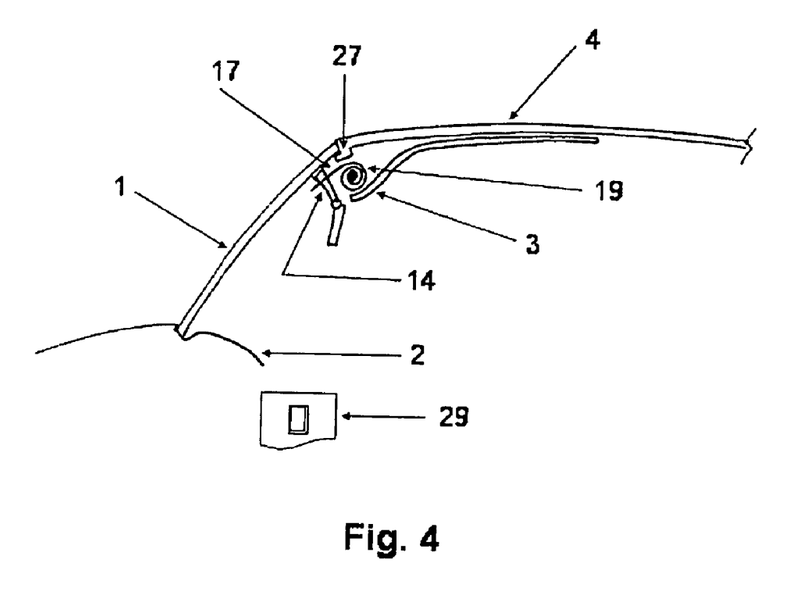
FIG. 4 shows a housing and a screen rolled up therein, positioned above a windshield frame of a vehicle and below the roof liner (vanity cover) with spring steel stiffener (guide wire), spring loaded roller and rear view mirror post.
Figures 5A, 5C:
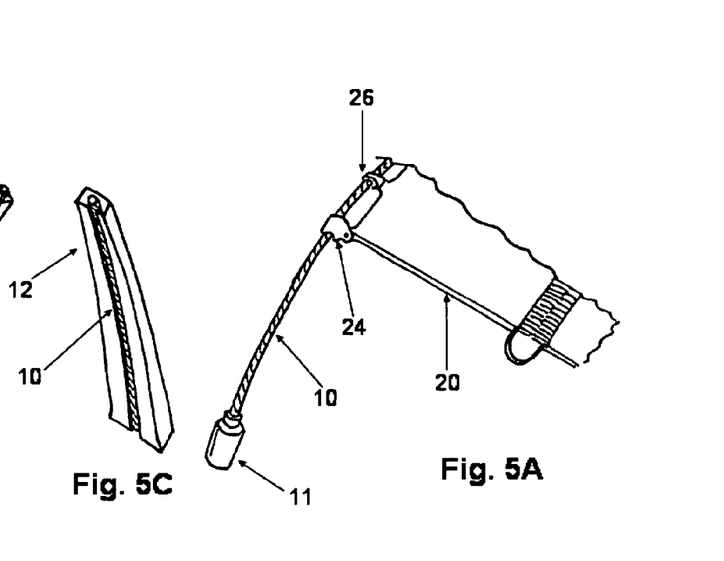
FIG. 5A shows a long flexible screw, drive motor, nut attached to the screen and non-screw type loops used to guide the screen along long flexible screw.
FIG. 5C shows a view of a long screw positioned inside an "A" pillar, and a thin slit in the "A" pillar for a screen to move up and down along.
Figure 5B:
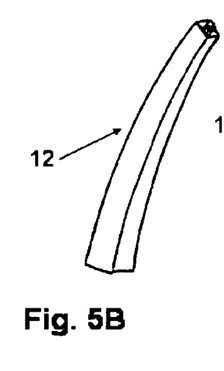
FIG. 5B shows a perspective view of an "A" pillar.

In one embodiment of the present invention, an apparatus that functions as a retractable full cover sun visor and full windshield cover are provided, including a flexible screen 17 which is electromechanically driven to be coiled or rolled up into an integrated longitudinal compartment 5 (see FIGS. 2 and 4) when not in use (i.e., when retracted). Compartment 5 may be housed in a roof interior of a motor vehicle adjacent to an upper edge of the windshield frame 27, and may be partially or completely covered by the roof liner 3 of the interior of the vehicle. Two rotatable screws 10 (one of which is shown in FIG. 5A) mounted on bidirectional electric motors 11 that may be housed under the dashboard on either side below "A" pillars 12, drive the screen in up and down directions to retract and deploy the screen, respectively. Motors 11 are powered by the electrical system of the vehicle to operate the sun visor and the full windshield cover. An interlock 21 (FIG. 6) may be provided to ensure the proper sun visor position for safe driving when the car is in drive mode. The interlock 21 may be programmable to select preferred visor positions, depending upon the height of the driver, but may be limited to a maximum deployment position, beyond which the Department of Transportation has regulated as being an unsafe, illegal setting. When switch 29 is activated to deploy screen 17 while the car is operating (e.g., in drive 33 or reverse modes), interlock 21 may prevent screen from deploying beyond the visor position, with the result of the operator's deployment of switch 29 being a deployment of screen 17 to the visor position 37. Further, the same interlock may also enable the deployment of the screen 17 as a full windshield cover 35 only when the car is engaged in "PARK" setting 32 (or, other safety requirement, such as when the vehicle is turned off and the parking brake is set, in the case of manual transmission vehicles, for example), and to prevent full deployment otherwise to the full windshield cover deployment position.

Figure 6:
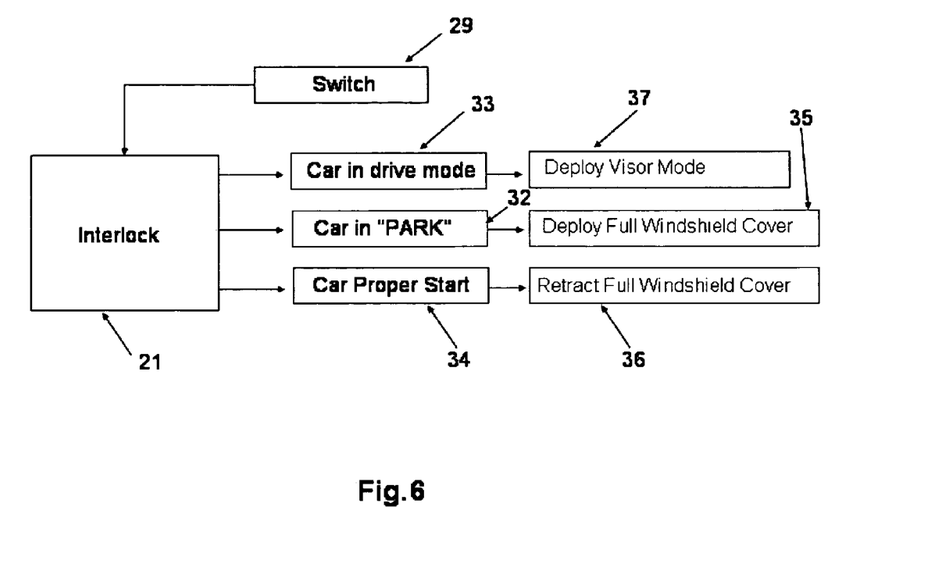
FIG. 6 is a block diagram showing the interoperability of a switch and interlock in controlling various movements of a screen.

Interlock 21 may further prevent screen 17 from being retracted from the windshield cover deployment position until the vehicle is shifted out of "PARK" (or other safety requirement is met). Optionally, the interlock may automatically retract screen 17 from the full windshield cover deployment position when the vehicle is shifted out of "Park". Such retraction may automatically take place to position screen in the visor deployment positioning. Alternatively, the apparatus may be programmed to automatically fully retract screen 17 when the vehicle is shifted out of "Park". If the vehicle is not running, the interlock may prevent screen 17 from being retracted from the windshield cover deployment 36 position unless the vehicle is properly started 34. By properly started is meant that the vehicle is started by turning the key in the ignition, or by using various other keyless ignition starting codes or methods intended by the manufacturer to be used by the owner of the vehicle for starting it. In addition to properly starting the vehicle, the interlock may optionally require the input of a code to allow screen 17 to be retracted after starting the vehicle. Still further optionally, in combination with the proper starting (and optionally the code), the gear lever of the vehicle may be required to be shifted to a "DRIVE" position, or into gear to retract screen 17. These requirements cause screen 17 to block the view through the front windshield and help to prevent car theft or at least be a significant deterrent for a possible car theft. Once the requirements have been met, screen 17 may be automatically retracted either to the visor position, or the fully retracted position. The choice of these options may be user programmable.

Provision may be made to accommodate the post 14 of the rear view mirror 15 of the vehicle when screen 17 retracts all the way up in to its longitudinal housing 5 (see FIGS. 2 and 4), with the use of bristle or brush-edge 16. However, if the rear view mirror is designed so that post 14 is located behind the longitudinal housing of screen 17, then a single screen 17 can be used, and it is not necessary to provide a brush-edge gap eliminator 16. A screen stiffener 20 may be provided in any embodiment, to provide more structural rigidity of the leading edge of the screen which helps to deploy and retract it. Screen stiffener 20 may be a metallic wire, rod, or other stiffening element attached to or sewn into the leading edge of screen 17.

An embodiment of an apparatus may also be installed on a rear windshield of a vehicle to function as a visor as well as a full cover. When installed on the rear windshield, the interlock may also disable rolling up of the screen in the event of improper ignition/start of an automobile. This may also help to deter car theft. Additionally, the interlock may also activate the screen 17 to be retracted when the vehicle is shifted into a "REVERSE" gear. Screen 17 may also be made of a semi-transparent material to allow it to be deployed while an automobile is in drive mode to enable a driver to see the cars behind but cut off the glare from the sun.

A control mechanism, such as a switch 29, for example, may be provided for manually initiate automatic control of one or more apparatus, such as to actuate motors 11 to deploy one or more screens to the visor position or to fully retract one or more screens. Switch 29 may also be used to control the motors to deploy to the full cover position or retract therefrom, but these functions may be overridden by the interlock, depending upon how the interlock is set up. Further, the interlock 21 may be integrated with the switch 29.

Figure 1:
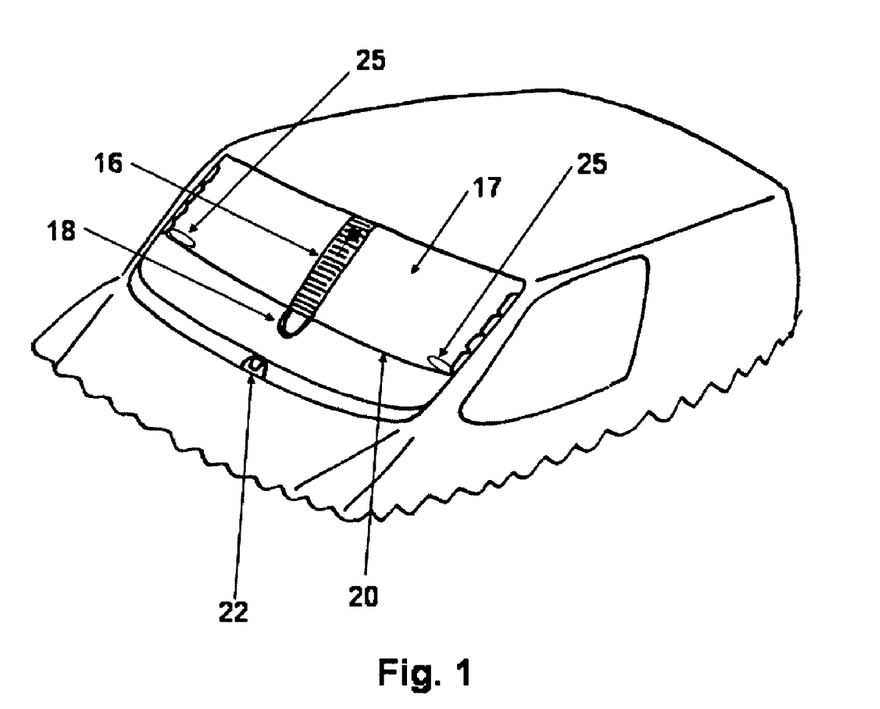
FIG. 1 shows the partial deployment of an apparatus from a top toward the bottom of a windshield of a motor vehicle.
Figure 3:
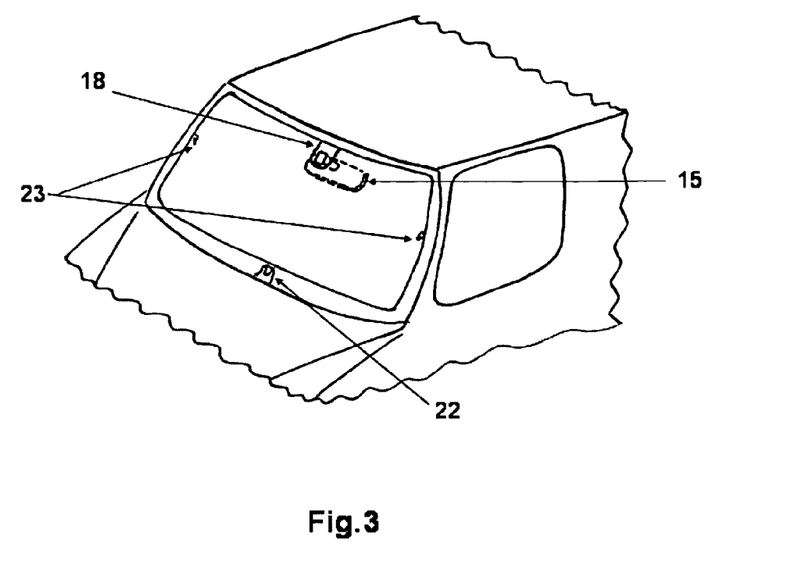
FIG. 3 shows hooks for manual deployment of a screen at visor and at fully rolled down positions of the screen, with under wire to accommodate the rear view mirror post.

One embodiment of the present apparatus includes a flexible screen 17 which is configured to be coiled or rolled into an integrated longitudinal compartment 5 when not in use. Screen 17 may be made of a flexible fabric or a reflective film such as Mylar. A drive mechanism of the apparatus includes at least one motor 11 and long screw 10. Long screw 10 may be flexible in bending about its longitudinal axis to allow it to conform to the contours of a pillar or other vertical guide structure in which it is placed, but is relatively rigid under compression along the longitudinal axis to permit it to drive screen 17 properly. A control mechanism, such as a simple power switch may be located near other, like controls, such as on the dashboard of the vehicle. An electrically powered, electronically-controlled interlock may be configured to enable multi-position deployment of screen 17 as well as to prevent accidental full deployment when safety prohibits (as when driving down the road in a car). The invention may also be used in a manual, non-motorized version by foregoing the motor, drive and electronic control. For manual deployment, one or more hooks 23 or other anchors may be provided for attaching screen 17 to one or more fixed visor locations, to function as a visor, and one or more hooks 22 may be provided at a location at the bottom of the windshield 1 (e.g., on the dashboard) to hold (restrain) the screen down to function as a full windshield cover. In the example of FIG. 1, U-shaped member 18 is configured to be releasably engaged by hook 22 to temporarily lock screen 17 in the fully deployed configuration. Other hooks or engagement features may be provided on screen 17 to temporarily lock its leading edge to one or more anchors fixed at or near the bottom of the windshield to be covered. FIG. 3 shows a manually deployable apparatus where engagement member 18 is releasably engaged by mating engagement member 22 to temporarily lock screen 17 in the fully deployed configuration. Side engaging members 23 are provided to releasably engage cooperating side engaging members 25 provided at the end portions of the leading edge of screen 17 to fix screen 17 in the visor position. Multiple cooperating side engagement members 25 (see FIG. 2) may be provided on screen 17 (or alternatively, multiple side engagement members 23 may be provided along the frame of the windshield) to allow screen 17 to be fixed at varying visor height levels. Housing 5 may include one or more spring loaded rollers 19 to retract screen 17 in manual mode, or to assist retraction under automatic, motor driven mode.

The current apparatus may thus function as a replacement for conventional visors to block the sun, additionally, with screen 17 also optionally providing a reflective interior surface (as a 'vanity mirror'). When fully deployed, screen 17 may provide a barrier against the effects of the sun by completely covering the windshield. At the same time, a restriction of heat may be provided into the protected chamber behind the windshield. Still further, a logo, advertisement or other marking may be provided on either or both of the outside and inside surfaces of screen 17.

The drive mechanism may automatically deploy screen 17 to variable positions, and can double as a guide for the travel of the screen 17. That is, the long screws (and additional guides, if used) can be bent (without kinking) or otherwise conformed to the curvature of a windshield, so that the deployment of the screen 17 closely follows the curvature of the surface of the windshield. The vertical guides (such as pillars 12 or other vertical guiding structure provided) control the position of screen 17 against the surface of the windshield. The enclosure 5 provides the 'home' for the non-extended screen when not in use, and is generally hidden within the roof of the vehicle above front and/or rear windshields, and is designed to not protrude or otherwise present a safety hazard.

The control switch may be a momentary-type version which allows variable deployment to a predetermined distance which is prescribed by, for example Department of Transportation (DOT hereafter) regulations for safe driving conditions. The interlock may be engaged by actuation of control mechanism (e.g., the switch), and may prevent full vision blocking deployment of screen 17 while an automobile is in drive mode. Further, when changing from a driving mode to a non-driving mode, the interlock may control one or more motors 11 to automatically, fully deploy screen(s) 17.

In one embodiment of use of the apparatus in an automotive application, for first setting level deployment, the control switch is manually actuated (the switch may be actuated by pulling it down to emulate the action of screen 17, for example), to engage drive motor(s) 11 which rotate to drive long screws 10 in rotation to translate drive members (e.g., drive nuts 24) along the long screws 10 in a downward direction to deploy screen 17. Screen 17 is attached to drive members 24. Further, screen 17 may be provided with one or more guide features 26 on each side thereof that slide over long screws 10 as screen 17 is deployed, to help maintain screen fully deployed along its width. Screen 17 is thus drawn out of it housing along long screws 10 to a predetermined position, which is either programmed into the interlock mechanism according to a user's choice (there may be multiple program settings for multiple users) or is a default setting, that corresponds to a vertical dimension analogous to that of conventional sun visors. In automotive applications the second setting level deployment (full deployment) may only be possible when the auto is parked, thereby allowing the interlock to release the drive mechanism for full extension. In what can be a configurable actuation, the screen 17 can be set to automatically deploy to full extension at the 'park' setting, or selectively actuated via the control switch and governed by the interlock.

For the manual implementation, one or more screens 17 may be pulled down to a preset governed detent—one of two; driving and park. When pulled fully down, one or more engagement features (e.g., loop 22) may be secured by a stationary cooperating engagement feature (e.g., hook) mounted onto the vehicle's dashboard or rear deck. Guidance and stowing of the screens 17 are the same, with the exception of a substitution of a smooth rod instead of a 'threaded' long screw. For deployment to the visor position, one or more engagement features 23 (e.g., hooks, or the like) may be provided along side the windshield at a height or heights where the leading edge of the screen 17 is desired to be deployed to. Features 23 may be installed on the A pillars 12, or on the side framing of the windshield, etc.

The screen enclosure/housing 5 and guides can either be built into the structure of the parent assembly (motor vehicle) or exist outside or independently from the structure. Methods for creating the drive mechanism can vary widely, including the spiral long screw type drive described above, gear-driven drive, cable driven mechanism, etc. Screen 17 may be made of many material types, depending on the desired design direction for the invention: a stable, metallized Mylar film could be used where stretching to gain non-rectilinear coverage is not required; a perforated, stretchable cloth may be used to allow stretching. Other plastics, including, but not limited to, Nylon, Kevlar or polyester may be used. Methods for ensuring full coverage for the windshield application about the rear-view mirror can be substituted, varying from the use of a dual-sided brush closure 16, to the use of an over-lapping design of the screen.

Guidance of deployment and retraction of screen 17 may be performed by long screws 10 alone, and pillars or other vertical guide features are not necessarily required. Alternatively the long screws may be installed in the pillars of a vehicle. The 'A' pillar long screws 10 may be installed in the A pillars (pillars adjacent the windshield of a vehicle) to drive screen 17 for the front windshield. Long screws may be made of steel, aluminum, Nitinol, Nylon, or other metals or durable polymers suitable for the driving function and that provide the requisite bending flexibility and rigidity under compression.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope That which is claimed is:

1. A multifunction, retractable sun shielding apparatus, comprising:
    a retractable screen and a housing configured to receive and contain said retractable screen upon retracting said retractable screen; said screen having two longitudinal edges extending generally in a direction of retraction and two transverse edges extending transversely to said longitudinal edges, one of said transverse edges being a leading edge during deployment of said retractable screen;
    a drive mechanism attached to said longitudinal edges of said screen, and configured to drive said screen in directions of retraction and deployment;
    a power switch actuatable by an operator to drive said drive mechanism to deploy or retract said retractable screen; and
    an interlock to automatically stop deployment of said retractable screen at a first predefined position where said screen functions as a visor with regard to an adjacent windshield and covers a top portion of the adjacent windshield, and a second predefined position where said screen substantially fully covers the adjacent windshield.

2. The apparatus of claim 1, wherein said drive mechanism comprises at least one motor and a pair of long screws drivable by said at least one motor.

3. The apparatus of claim 2, further comprising a drive nut on each said long screw, said drive nuts being attached to opposite ones of said longitudinal edges.

4. The apparatus of claim 1, wherein said screen is automatically, fully received in said housing upon full automatic retraction of said screen by said drive mechanism.

5. The apparatus of claim 1, wherein said screen is manually deployable and retractable.

6. The apparatus of claim 2, wherein each said long screw is flexible in bending about a longitudinal axis thereof, and substantially rigid under compression along said longitudinal axis.

7. The apparatus of claim 1, installed in an automotive vehicle to replace conventional visors in the vehicle, wherein said screen is deployable to said first predefined position to function as vehicle visors with respect to a windshield of the vehicle, and is further deployable to said second predefined position to cover the windshield for substantially blocking sunlight through the windshield.

8. The apparatus of claim 1, further comprising a brush edge-page eliminator installed between left and right portions of said screen, and configured to allow said screen to be retracted past a rear view mirror screen post.

9. The apparatus of claim 2, installed in an automotive vehicle to function as a visor and full cover of a windshield, said long screws are installed in adjacent pillars of the automotive vehicle.

10. The apparatus of claim 1, installed in an automotive vehicle, wherein said interlock is further configured to automatically deploy said screen to said second predefined position when said automotive vehicle is parked.

11. The apparatus of claim 1, installed in an automotive vehicle, wherein said interlock is further configured to automatically prevent said screen from retracting from said second predefined position unless the vehicle is properly started.

12. The apparatus of claim 1, installed in an automotive vehicle, wherein said interlock is further configured to automatically deploy said screen to said second predefined position when said automotive vehicle is turned off from running.

13. The apparatus of claim 1, wherein said interlock is programmable to redefine said first predefined position.

14. The apparatus of claim 1, installed in an automotive vehicle, wherein said interlock is further configured to automatically deploy said screen to said first predefined position when said automotive vehicle upon properly starting said automotive vehicle.

15. A method of partially or fully covering a windshield of an automotive vehicle, said method comprising:
    driving a retractable screen in a direction from a top of the windshield toward the bottom of the windshield, to a first predefined position where said screen functions as a visor; and
    driving the retractable screen to a second predefined position where said screen substantially completely covers the windshield.

16. The method of claim 15, wherein driving of said screen to said first and second positions are actuated by an operator's actuation of a power switch.

17. The method of claim 15, wherein said driving to a second predefined position is automatically actuated upon turning the automotive vehicle off.

18. The method of claim 15, wherein said driving to a second predefined position is automatically actuated upon shifting the automotive vehicle to a park setting and actuating a power switch.

19. The method of claim 15, wherein said driving to a second predefined position is prevented when the automotive vehicle is in a forward or reverse drive gear.

20. The method of claim 15, wherein said screen is automatically driven to a fully retracted position upon properly starting the automotive vehicle.

21. The method of claim 15, wherein said driving to said first and second predefined positions comprises manually driving the screen to said positions.

22. The method of claim 15, wherein the windshield is a front windshield.

23. The method of claim 15, wherein the windshield is a rear windshield.

24. A multifunction, retractable sun shielding apparatus built into the interior of an automotive vehicle, said apparatus comprising:
    a retractable screen dimensioned to cover a windshield of the automobile and a housing configured to receive and contain said retractable screen upon retracting said retractable screen in a direction from a bottom of the windshield toward a top of the windshield; said screen having two longitudinal edges extending generally in a direction of retraction and two transverse edges extending transversely to said longitudinal edges, one of said transverse edges being a leading edge during deployment of said retractable screen, and said housing being mounted adjacent to an upper edge of the windshield;
    a drive mechanism biased to fully retract said screen when said screen is not restrained;
    a pair of engagement features provided to restrain said screen at a predefined position to cover a top portion of the windshield where said screen functions as a visor; and a full deployment engagement feature to restrain said screen at a second predefined position to cover substantially all of the windshield with said screen.

25. The apparatus of claim 24, further comprising a pair of elongated rods extending adjacent opposite sides of the windshield, and each of said longitudinal edges of said screen having at least one guide loop attached thereto and slidably extensible over one of said elongated rods, wherein said longitudinal edges are guided along said elongated rods via said loops during deployment and retraction of said screen.

26. The apparatus of claim 25, wherein said elongated rods are concealed within A pillars of the automotive vehicle.

27. The method of claim 15, wherein, when driven to the first predefined position to function as a visor, the screen prevents viewing therethrough; and, when driven to the second predefined position where the screen substantially completely covers the windshield, the screen prevents viewing therethrough.

* * * * *